(No Model.)
W. W. JACKSON.
BUSHING VALVE AND FAUCET ATTACHMENT FOR CASKS.
No. 537,158. Patented Apr. 9, 1895.
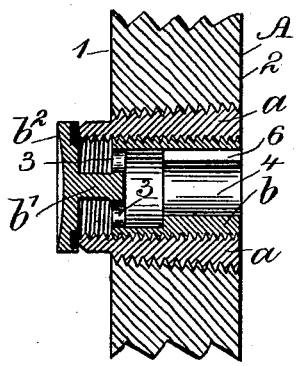
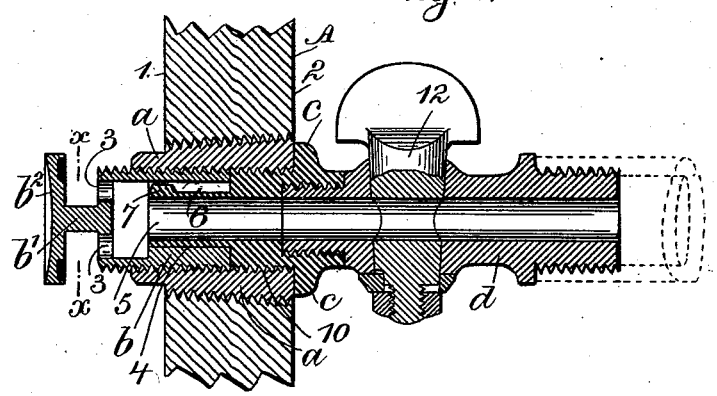
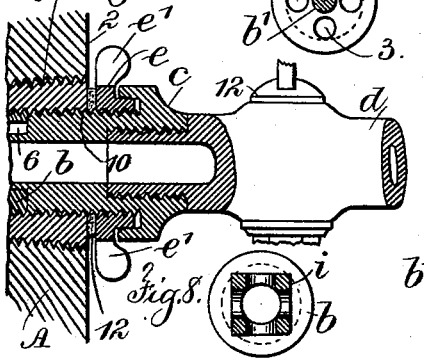
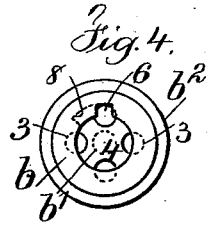
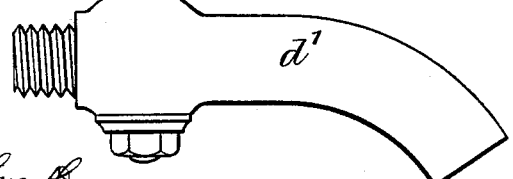
Witnesses
Chas H Smith
J. Staib
Inventor
Wm W Jackson
per Lemuel W Serrell
Atty
THE NORRIS PETERS CO., PHOTO-LITHO., WASHINGTON, D. C.

United States Patent Office.

WILLIAM W. JACKSON, OF NEW YORK, N. Y., ASSIGNOR TO JOSEPH LIVINGSTON AND ALBERT H. GROSS, OF SAME PLACE.

BUSHING-VALVE AND FAUCET ATTACHMENT FOR CASKS.

SPECIFICATION forming part of Letters Patent No. 537,158, dated April 9, 1895.

Application filed February 28, 1894. Serial No. 501,759. (No model.)

*To all whom it may concern:*

Be it known that I, WILLIAM W. JACKSON, a citizen of the United States, residing in the city, county, and State of New York, have invented a new and useful Improvement in Bushing-Valves and Faucet Attachments for Casks, of which the following is a specification.

My present invention is designed as an improvement upon the device shown and described in Letters Patent granted to me April 6, 1886, No. 339,297. In this device the interior surface of the bushing is screw-threaded and provided with axial channels and the threaded portion of the faucet that engaged the interior threads of the bushing had openings communicating with the open center of the faucet or coupling, and the liquor in discharging from the tank passed through the axial channels of the bushing, the openings of the faucet at right angles thereto and then through the open center of the faucet. This circuitous passage causes the liquor to froth and this frothing is objectionable, and the object of my present improvement is to overcome this difficulty.

In carrying out my present invention the stem of the bushing valve is made hollow and with end openings adjacent to the solid disk that closes against the bushing, and the faucet or coupling is made with an opening entirely through the center and with a tubular end that passes into the hollow stem of the bushing valve and a central and straight away passage is thus formed for the discharge of the liquor in the cask.

The tubular end of the faucet or coupling has an exterior lug and the bushing valve a groove and end recess therefor, and the operation of screwing the coupling or faucet into the bushing and simultaneously screwing out the bushing valve is the same as set forth in my before named patent, the office of the lug being to turn the bushing valve in either direction by the faucet, and the office of the end recess being to receive the lug and prevent the coupling or faucet accidentally falling away from the bushing valve when the same is closed to shut off the discharge of liquor from the cask.

In the drawings, Figure 1 is a vertical longitudinal section showing my bushing valve and coupling in position for use. Fig. 2 is a vertical longitudinal section showing the bushing valve closed. Fig. 3 is a cross section at the line $xx$ of Fig. 1. Fig. 4 is an elevation of the outer face of the bushing valve. Fig. 5 is an elevation of the back end of the coupling or faucet. Fig. 6 shows part of a faucet interchangeable with the coupling Fig. 1. Fig. 7 is a longitudinal section; Fig. 8, a cross section at $yy$, and Fig. 9 a cross section at $zz$ illustrating a slight modification in the construction of the bushing valve, and Fig. 10 is a vertical section and elevation illustrating a modification hereinafter described.

In Figs. 1, 2 and 10, A represents the head of the cask, of which 1 is the inner face and 2 the outer face. The bushing $a$ is threaded upon its tapering exterior as usual to screw into the opening made for it in the head A, and a plain portion of the bushing projects within the cask. The parallel inner surfaces of the bushing $a$ are threaded their entire length.

The bushing valve is composed of the hollow body portion $b$, the stem $b'$ and disk $b^2$. The hollow portion is screw threaded upon the exterior to mesh with the internal bushing threads, and the stem $b'$ connects the part $b$ and disk $b^2$, the said disk when the valve is closed being seated against the end of the bushing, as shown in Fig. 2.

The end of the hollow portion $b'$ is provided with a number of holes 3 around the stem. The opening 4 in the valve receives the tubular end 5 of the coupling or faucet and the groove 6 the lug 7 of said end, and the recess 8 receives the lug 7 upon the turning and removal of the coupling or faucet.

The coupling is composed of two parts $c\,d$, the part $d$ being removable and interchangeable with the faucet $d'$, and the tubular end 5 and lug 7 are integral with the part $c$. The exterior of the part $c$ at 10 is of the same diameter as the bushing valve portion $b$ and is similarly screw threaded to screw into the bushing.

With the bushing valve closed, as shown in Fig. 2, the coupling or faucet is connected to the bushing as follows: The tubular portion or end 5 and lug 7 are inserted into the opening 4 and groove 6 of the bushing valve, and the face of the part c is brought up against the face of the bushing valve. The coupling or faucet is now turned and the threads at 10 engaged with the interior of the bushing, and simultaneously the bushing valve is unscrewed and projected within the cask. This movement is arrested when the flange of the part c comes up against the bushing, as shown in Fig. 1, and in which position the bushing valve is opened up to the flow of liquor through it and through the coupling or faucet when the plug 12 is turned to open the passage way through the coupling or faucet.

The part d is employed when the contents of a cask are to be drawn off to another vessel and the part or faucet d' when the contents of a cask are delivered direct for use.

To remove the coupling or faucet and close the bushing valve, the parts c d or c d' are now turned in the opposite direction. The lug 7 is now brought over into the recess 8 before the valve commences to turn, and said lug remains in said recess until the valve is completely closed as shown in Fig. 2, and thereafter to prevent the tubular portion 5 of the coupling or faucet accidentally coming out of the valve. After the valve is closed a small turn in the opposite direction permits the portion 5 and lug 7 to be withdrawn from the valve.

In the modification shown in Figs. 7, 8 and 9, the stem i is made hollow and openings are made through said stem preferably in opposite directions for the discharge of liquor.

It is desirable for convenience in operating the plug 12 that the plug should come to a vertical position as the coupling is screwed to place. This usually cannot be insured by the devices before described and the cask cannot be turned to a different position as it would disturb the necessary quiescent condition of the liquor.

To provide for bringing the plug 12 vertical, I recess the face of the parts c, as shown in Fig. 10, and continue the screw thread at 10 into the recess, and I provide a flanged sleeve e with an internal thread fitting the threads at 10 and fitting into the recess, and this sleeve e has opposite finger lugs e' and a washer 13 between the sleeve e and the face of the bushing a.

In introducing the coupling or faucet and opening the valve and before the coupling is fully screwed in the plug 12 is placed vertically and the flanged sleeve e is turned slightly backward to bring the washer 13 tightly against the face of the bushing a in securing the parts in place.

In cases where interlocking projections on the coupling and tubular valve stem have been employed, there is a risk that they may not be placed together properly, and that the screw threads on the exterior may not properly coincide and hence will be liable to jam and not rotate freely. By the tubular projection at the end of the coupling telescoping or passing into the tubular interior of the valve stem, the parts are brought axially into line, and there being but one lug and its groove, it is impossible to misplace the coupling, and the parts which are reliably connected with the screw threads on the exterior surface of the coupling are continuations of the screw threads on the tubular valve stem. Hence the parts can be turned with freedom in opening or closing the valve.

I claim as my invention—

1. The combination with a bushing adapted to be screwed into a cask and having a cylindrically screw threaded interior, of a valve adapted to close against the inner end of the bushing, a tube connected therewith and having inlet openings for the liquid and screw threaded on the exterior to fit the screw thread of the bushing and having a longitudinal groove in its interior surface, a tubular coupling with a screw threaded exterior to fit the internal screw of the bushing, and a tubular projection to pass into the tube of the valve and having a lug to pass into the groove thereof for rotating the valve and its cylinder by the lug of the coupling, substantially as set forth.

2. The combination with a bushing adapted to be screwed into a cask and having a cylindrically screw threaded interior, of a valve adapted to close against the inner end of the bushing, a tube connected therewith and having inlet openings for the liquid and screw threaded on the exterior to fit the screw thread of the bushing and having a longitudinal groove in its interior surface, a tubular coupling having a screw thread to fit the internal screw of the bushing, and a tubular projection to pass into the tube of the valve and having a lug to pass into the groove thereof for rotating the valve and its cylinder by the lug of the coupling, there being a recess at the inner end of the groove for receiving the lug so that the coupling can be partially turned in unscrewing the same before commencing to rotate the valve, substantially as set forth.

3. The combination with a bushing adapted to be screwed into a cask and having a cylindrically screw threaded interior, of a valve adapted to close against the inner end of the bushing, a central stem to the valve, a tube carrying the stem and screw threaded on the exterior to fit the screw thread of the bushing and having a longitudinal groove in its interior surface, a tubular coupling adapted to fit into the tube of the valve and having a lug to pass into the groove thereof for rotating the valve and its cylinder by the lug of the coupling, such coupling being screw threaded to fit the internal screw of the bushing, there being a recess at the inner end of the groove for receiving the lug so that the coupling can be partially turned in unscrewing the same before commencing to rotate the valve, substantially as set forth.

Signed by me this 21st day of February, 1894.

W. W. JACKSON.

Witnesses:
GEO. T. PINCKNEY,
HAROLD SERRELL.